(12) United States Patent
Kallas et al.

(10) Patent No.: US 11,468,447 B2
(45) Date of Patent: Oct. 11, 2022

(54) SYSTEM FOR IDENTIFYING POINTS OF COMPROMISE

(71) Applicant: U.S. Bancorp, National Association, Minneapolis, MN (US)

(72) Inventors: Christopher Kallas, Minneapolis, MN (US); Xiaoqiao Wei, Minneapolis, MN (US)

(73) Assignee: U.S. Bancorp, National Association, Minneapolis, MN (US)

(*) Notice: Subject to any disclaimer, the term of this patent is extended or adjusted under 35 U.S.C. 154(b) by 79 days.

(21) Appl. No.: 16/562,724

(22) Filed: Sep. 6, 2019

(65) Prior Publication Data

US 2021/0073817 A1    Mar. 11, 2021

(51) Int. Cl.
G06Q 20/40      (2012.01)
G06F 21/57      (2013.01)
G06Q 20/38      (2012.01)

(52) U.S. Cl.
CPC ....... G06Q 20/4016 (2013.01); G06F 21/577 (2013.01); G06Q 20/389 (2013.01); G06F 2221/2111 (2013.01)

(58) Field of Classification Search
CPC .......................... G06F 21/577; G06Q 20/4016
See application file for complete search history.

(56) References Cited

U.S. PATENT DOCUMENTS

| | | | |
|---|---|---|---|
| 5,884,289 A | 3/1999 | Anderson et al. | |
| 6,094,643 A | 7/2000 | Anderson et al. | |
| 8,036,967 B2 | 10/2011 | Adams | |
| 8,386,381 B1 | 2/2013 | Barton et al. | |
| 8,473,415 B2 | 6/2013 | Siegel et al. | |
| 8,600,872 B1 | 12/2013 | Yan | |
| 8,612,340 B1 | 12/2013 | Yan | |
| 9,563,921 B2 | 2/2017 | Shi et al. | |
| 10,115,153 B2 | 10/2018 | Zoldi et al. | |
| 10,284,590 B2 | 5/2019 | Ramos De Araujo et al. | |
| 10,290,001 B2 | 5/2019 | Adjaoute | |
| 2005/0055373 A1* | 3/2005 | Forman | G06F 21/55 |
| 2009/0125543 A1* | 5/2009 | Patil | G06Q 30/06 |
| 2009/0234899 A1* | 9/2009 | Kramer | G06F 16/2465 708/200 |
| 2010/0106692 A1* | 4/2010 | Moloney | H03M 7/3066 708/203 |
| 2015/0339673 A1 | 11/2015 | Adjaoute | |
| 2016/0132886 A1* | 5/2016 | Burke | G06Q 20/3827 705/44 |
| 2017/0206089 A1* | 7/2017 | Hosoi | G06F 9/3887 |
| 2019/0188721 A1* | 6/2019 | Wiese | G07F 19/206 |
| 2020/0311736 A1* | 10/2020 | Song | G06Q 20/383 |
| 2020/0372097 A1* | 11/2020 | Matti | G06F 17/16 |

\* cited by examiner

*Primary Examiner* — Hao Fu

(74) *Attorney, Agent, or Firm* — Foley & Lardner LLP

(57) ABSTRACT

The disclosure describes an apparatus having programmed instructions that when executed cause the apparatus to receive, via a communication network, information regarding suspicious fraud activity at a first location involving a plurality of transaction cards; monitor changes over a first time interval to received information regarding suspicious fraud activity at the first location; and identify a point-of-compromise (POC) location based on monitored changes surpassing a threshold indicating suspicious fraud activity at the first location over the first time interval.

18 Claims, 13 Drawing Sheets

|   | L1 | L2 | L3 | L4 | L5 | L6 | L7 | L8 |
|---|----|----|----|----|----|----|----|----|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 0 | 0 | 0 | 1 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5A

|  | L1 | L2 | L3 | L4 | L5 | L6 | L7 | L8 |
|---|----|----|----|----|----|----|----|----|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 0 | 1 | 0 | 1 | 0 | 0 | 0 |
| C6 | 0 | 1 | 0 | 0 | 0 | 1 | 1 | 1 |
| Total Cards | 21 | 47 | 33 | 12 | 26 | 40 | 47 | 52 |

FIG. 5B

|  | L1 | L2 | L3 | L4 | L5 | L6 | L7 | L8 |
|---|---|---|---|---|---|---|---|---|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 2 | 0 | 0 | 0 | 2 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5C

|  | L1 | L2 | L3 | L4 | L5 | L6 | L7 | L8 |
|---|---|---|---|---|---|---|---|---|
| C1 | 1 | 0 | 0 | 2 | 0 | 2 | 2 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 0 | 0 | 0 | 1 | 0 | 0 | 0 |
| C6 | 0 | 1 | 1 | 0 | 0 | 1 | 1 | 1 |
| Total Cards | 21 | 45 | 33 | 8 | 26 | 40 | 47 | 52 |

FIG. 5D

|    | L1 | L2 | L3 | L4 | L5 | L6 | L7 | L8 | L9 |
|----|----|----|----|----|----|----|----|----|----|
| C1 | 0  | 0  | 0  | 1  | 0  | 1  | 1  | 0  | 0  |
| C2 | 1  | 0  | 1  | 0  | 0  | 0  | 0  | 0  | 1  |
| C3 | 0  | 1  | 0  | 1  | 1  | 0  | 0  | 0  | 0  |
| C4 | 0  | 0  | 0  | 0  | 0  | 1  | 1  | 1  | 0  |
| C5 | 1  | 0  | 0  | 0  | 1  | 0  | 0  | 0  | 0  |
| C6 | 0  | 1  | 1  | 0  | 0  | 1  | 1  | 1  | 1  |
| Total Cards | 21 | 45 | 33 | 8 | 26 | 40 | 47 | 52 | 66 |

FIG. 5E

|  | L1 | L2 | L3 | L4 | L5 | L6 | L7 | L8 |
|---|---|---|---|---|---|---|---|---|
| C1 | 0 | 0 | 0 | 1 | 0 | 1 | 1 | 0 |
| C2 | 1 | 0 | 1 | 0 | 0 | 0 | 0 | 0 |
| C3 | 0 | 1 | 0 | 1 | 1 | 0 | 0 | 0 |
| C4 | 0 | 0 | 0 | 0 | 0 | 1 | 1 | 1 |
| C5 | 1 | 0 | 0 | 0 | 1 | 0 | 0 | 0 |
| C6 | 0 | 1 | 1 | 1 | 0 | 1 | 1 | 1 |
| C7 | 0 | 0 | 1 | 1 | 0 | 0 | 0 | 1 |
| Total Cards | 21 | 45 | 34 | 9 | 26 | 40 | 47 | 53 |

FIG. 5F

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 0 | 1 | 0 | 1 | 1 | 0 | 3 | 0 |
| C2 | 1 | 0 | 1 | 0 | 0 | 0 | 0 | 0 | 2 | 0 |
| C3 | 0 | 1 | 0 | 1 | 1 | 0 | 0 | 0 | 3 | 0 |
| C4 | 0 | 0 | 0 | 0 | 0 | 1 | 1 | 1 | 3 | 0 |
| C5 | 1 | 0 | 0 | 0 | 1 | 0 | 0 | 0 | 2 | 0 |
| C6 | 0 | 1 | 1 | 0 | 0 | 1 | 1 | 1 | 5 | 0 |
| C7 | 0 | 0 | 1 | 1 | 0 | 0 | 0 | 1 | 3 | 0 |
| POC Indicator | 2 | 2 | 3 | 3 | 2 | 3 | 3 | 2 | n/a | n/a |
| POC Acceleration | 0 | 0 | 0 | 0 | 0 | 0 | 0 | 0 | n/a | n/a |
| Total Cards | 21 | 45 | 34 | 9 | 26 | 40 | 47 | 53 | n/a | n/a |

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | *1* | *2* | 0 | *2* | 1 | 0 | *6* | *1* |
| C2 | 1 | 0 | 1 | 0 | 0 | 0 | 0 | 0 | 2 | 0 |
| C3 | 0 | *2* | *1* | *2* | 1 | 0 | *1* | 0 | *7* | *1.33* |
| C4 | 0 | 0 | 0 | 0 | 0 | 1 | 1 | 1 | 3 | 0 |
| C5 | 1 | 0 | *2* | 0 | 1 | 0 | 0 | 0 | 2 | 0 |
| C6 | 0 | *2* | 1 | 0 | 0 | *2* | *2* | *2* | *10* | *1* |
| C7 | 0 | 0 | 1 | 1 | 0 | 0 | 0 | 1 | 3 | 0 |
| POC Indicator | 2 | 4 | 5 | 5 | 2 | 5 | 4 | 3 | n/a | n/a |
| POC Acceleration | 0 | *1* | *0.667* | *0.667* | 0 | *0.667* | *0.334* | *0.5* | n/a | n/a |
| Total Cards | 21 | 45 | 34 | 9 | 26 | 40 | 47 | 53 | n/a | n/a |

| | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 1 | 2 | 0 | 2 | 1 | 0 | 6 | *0* |
| C2 | 1 | 0 | 1 | 0 | 0 | 0 | 0 | 0 | 2 | 0 |
| C3 | 0 | 2 | 1 | 2 | 1 | 0 | 1 | 0 | 7 | *0* |
| C4 | 0 | 0 | 0 | 0 | 0 | *2* | *2* | *2* | *6* | *1* |
| C5 | 1 | 0 | 0 | 0 | 1 | 0 | 0 | 0 | 2 | 0 |
| C6 | 0 | 2 | 2 | 0 | 0 | 2 | 2 | 2 | 10 | *0* |
| C7 | 0 | 0 | 1 | 1 | 0 | 0 | 0 | 1 | 3 | 0 |
| POC Indicator | 2 | 4 | 5 | 5 | 2 | *6* | *6* | *5* | n/a | n/a |
| POC Acceleration | 0 | *0* | *0* | *0* | 0 | *0.2* | *0.5* | *0.667* | n/a | n/a |
| Total Cards | 21 | 45 | 34 | 9 | 26 | 40 | 47 | 53 | n/a | n/a |

SYSTEM FOR IDENTIFYING POINTS OF COMPROMISE

BACKGROUND

The following description is provided to assist the understanding of the reader. None of the information provided or references cited is admitted to be prior art.

Credit and debit cards play a major role in financial transactions throughout the world. However, traditional credit and debit cards struggle with a number of drawbacks. For example, the magnetic stripe information can be compromised by a skimmer device placed in a point-of-sale location or card information can be stolen using a malware breach in a merchant's system. Compromised cards can then be used for fraudulent transactions. Failure to timely detect a point of compromise where card information is illegitimately obtained can result in more and more cards being used for fraud. Such activity causes significant business loss to card issuers. Furthermore, such fraud damages the trust and relationships between card issuers and customers.

Heretofore, attempts have been made to identify points of compromise in the financial card network using computer systems but such systems have not succeeded to quickly identify locations where card information is compromised and fraudulently used.

SUMMARY

In accordance with some aspects of the present disclosure, a system is disclosed to identify points of compromise using monitoring and analysis of interactions between the fraud cards and the points of sale. For purposes of this description, a fraud card is any credit and/or debit card including personal, business, and corporate, that had at least one known or suspicious fraud transaction within a certain time period, such as six months. The time window of the recent transactions is adjustable, depending on factors including the number of transactions, the risks of potential points-of-compromise, etc. The system selects a time window of recent transactions from which it cumulates fresh fraud transactions to monitor and detect any possible points-of-compromise.

In accordance with some aspects of the present disclosure, an apparatus includes programmed instructions that when executed cause the apparatus to receive, via a communication network, information regarding suspicious fraud activity at a first location involving a plurality of transaction cards; monitor changes over a first time interval to received information regarding suspicious fraud activity at the first location; and identify a point-of-compromise (POC) location based on monitored changes surpassing a threshold indicating suspicious fraud activity at the first location over the first time interval.

The received fraud transaction information can be arranged in a first two-dimensional matrix at a first time interval and in a second two-dimensional matrix at a second time interval. The apparatus can then determine from comparing data in the first two-dimensional matrix and the second two-dimensional matrix a point of compromise (POC) indicator, a POC acceleration indicator, and a card fraud acceleration indicator. The apparatus can then use these indicators to present a candidate POC location.

In accordance with some other aspects of the present disclosure, a computerized method is disclosed. The method includes collecting location data for suspicious fraud transactions involving a plurality of transaction cards over a first time window; repeating the collecting operations over additional time windows; constructing a three-dimensional matrix using collected locations, associated transaction cards, and time windows; updating the three-dimensional matrix after each new time window; and generating from the three-dimensional matrix at each update a candidate point-of-compromise (POC) location.

In accordance with yet other aspects of the present disclosure, a non-transitory computer readable media with computer-executable instructions embodied thereon is disclosed. The instructions when executed by a processor of a system cause a system to perform a process. The process includes collecting location data for suspicious fraud transactions over a first time window; collecting location data for non-fraud transactions over the first time window; repeating the collecting operations over additional time windows; constructing a three-dimensional matrix using collected locations, associated transaction cards, and time windows; updating the three-dimensional matrix after each new time window; and generating from the three-dimensional matrix at each update a point-of-compromise (POC) indicator, a POC acceleration indicator, and a card fraud acceleration indicator.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 5A is a reference matrix of transaction cards and locations for a particular time interval in accordance with some embodiments of the present disclosure.

FIG. 5B is a newly generated matrix for a subsequent time period after the time period shown in FIG. 5A where additional transactions occurred, but no new fraudulent transactions occurred.

FIG. 5C is a newly generated matrix for yet another subsequent time period after the time period shown in FIG. 5A where new fraudulent transactions occurred at locations where fraudulent transactions have occurred before.

FIG. 5D is a newly generated matrix for another subsequent time period after the time period shown in FIG. 5A where new fraudulent transactions for a specific card/location pair occurred, but there had previously been fraudulent transactions on that card and at that location.

FIG. 5E is a newly generated matrix for a subsequent time period after the time period shown in FIG. 5A where new fraudulent transactions occurred at a new location, but no new cards had fraudulent transactions.

FIG. 5F is a newly generated matrix for a subsequent time period after the time period shown in FIG. 5A where new fraudulent transactions occurred on new cards, but at locations that had previous fraudulent transactions.

FIGS. 6A-6C show multiple matrices from several subsequent time intervals which are used to generate point-of-compromise indicators, point-of-compromise acceleration indicators, and card fraud indicators.

Figure 1:
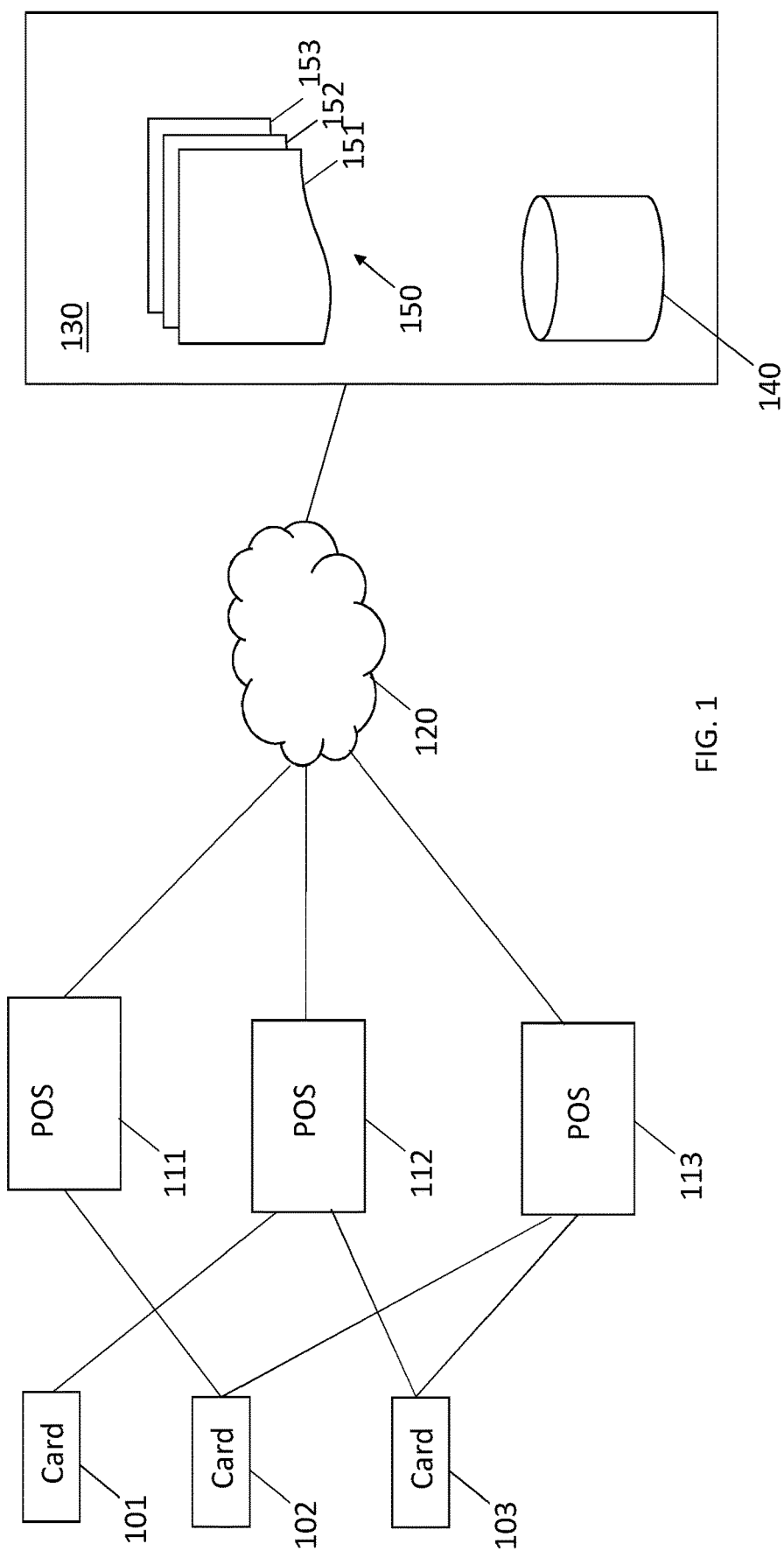
FIG. 1 is an example block diagram of a networked transaction system in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a point-of-compromise detection system having a point-of-compromise detection server in communication with points-of-sale devices through a network. The communication between the point-of-compromise detection server and the points-of-sale devices may be facilitated through an exchange application located at the point-of-sale device and on the point-of-compromise detection server. A variety of management and non-management related operations may be performed on the point-of-compromise detection system.

Exemplary embodiments described herein provide a point-of-compromise detection system that can automatically determine which points-of-sale devices and cards may be possible points-of-compromise. These points-of-compromise could have malware or physical devices that steal the magnetic stripe information from bank cards. Detecting these problematic point-of-sale locations can lead to investigation and repair of the point-of-sale. Similarly, bank cards such as credit or debit cards can be determined to be compromised. These compromised cards can be deactivated or de-authorized in order to prevent future fraudulent transactions. More specifically, the point-of-compromise detection system can use data analysis over intervals of time to determine which locations and cards are likely points-of-compromise, decreasing fraudulent transactions.

According to an exemplary embodiment, the point-of-compromise detection system can identify points-of-compromise, whether the points-of-compromise are compromised points-of-sale devices or compromised bank cards. The point-of-compromise detection system can determine which point-of-sale locations may have a card skimmer or a malware problem that is stealing card magnetic strip information. The point-of-compromise detection system can generate indicators based on the frequency of fraudulent transactions and the total number of transactions over specific time intervals. One indicator is the POC indicator which is helpful for identifying POCs with fewer total card transactions. Additionally, POC indicators are updated when the card is used in a fraudulent or suspicious transaction at another location. That way POC indicators can also be used to find POCs even when the card is not frequently used at the same location.

Advantageously, the present disclosure describes a system that can also use POC acceleration indicators. POC acceleration indicators are able to determine POCs that involve larger number of card transactions. POC acceleration indicators help identify when the number of fraudulent cards per time interval used at the location increases over time.

The present disclosure describes the technical challenges and the technical solutions associated with point-of-compromise detection systems. The embodiments described herein enable a scalable solution that detects points-of-compromise locations using time intervals and changes in frequency of detected suspicious activity. The embodiments result in a system that is much faster in identifying points-of-compromise locations than prior systems. The system can be updated and tuned to specific volumes of transactions at a location. The system can also be linked to particular merchants to identify points-of-compromise locations linked to a common merchant.

FIG. 1 illustrates a point-of-compromise detection system 100 that includes transaction cards 101, 102, 103; points-of-sale devices 111, 112, 113; network 120, and a point-of-compromise detection server 130. Each point-of-sale device 111, 112, 113 and the point-of-compromise detection server 130 may be coupled to network 120 through a network interface. Each of elements 111, 112, 113, 120, and 130 may be implemented or associated with hardware components, software components, or firmware components or any combination of such components. The point-of-compromise detection server 130 includes a memory or database 140 to store information received regarding the point-of-sale devices. The database 140 stores matrices 150 including matrix 151, matrix 152, matrix 153, etc. that contain data regarding transaction cards 101, 102, and 103 and points-of-sale devices 111, 112, and 113 as discussed in more detail below.

The point-of-compromise detection system 100 enables the detection of compromised transaction cards and/or compromised point-of-sale device locations using programmed instructions stored at the point-of-compromise detection server 130 that cause the point-of-compromise detection server 130 to analyze data received from the points-of-sale devices 111, 112, and 113 at multiple time intervals. Each matrix 151, 152, and 153 stores data regarding transaction cards and point-of-sale device locations over a different time interval. The point-of-compromise detection server 130 processes the matrices to identify points-of compromise in the point-of-compromise detection system 100, as described in more detail below.

Figure 2:
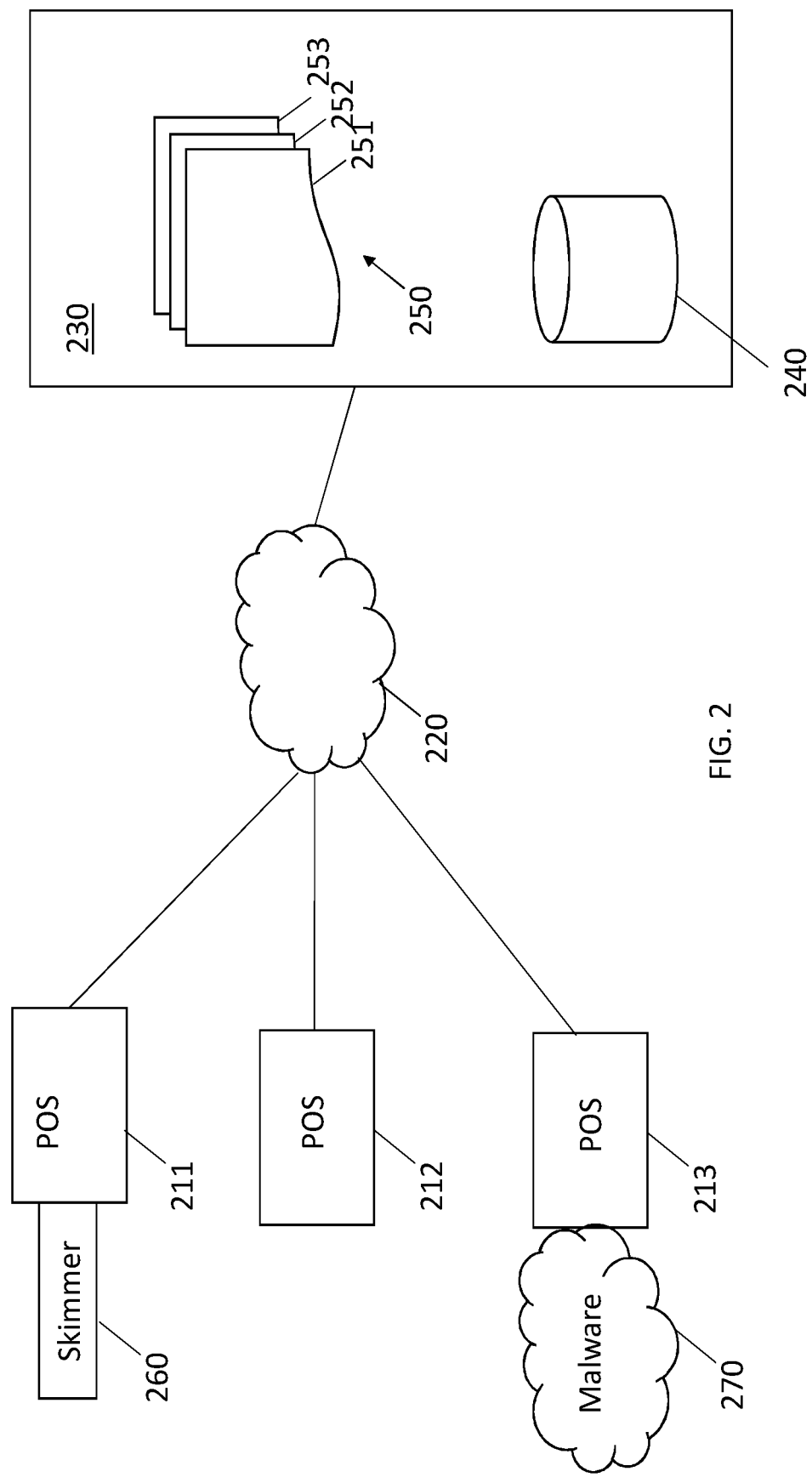
FIG. 2 is an example block diagram of a networked transaction system with some points of sale being compromised, in accordance with some embodiments of the present disclosure.

FIG. 2 illustrates a point-of-compromise detection system 200 that includes points-of-sale devices 211, 212, and 213; network 220, and a point-of-compromise detection server 230. The point-of-compromise detection server 230 includes a memory or database 240 to store information received regarding the point-of-sale devices in matrices 250 including matrix 251, matrix 252, matrix 253, etc. The point-of-compromise detection server 230 processes data received from the points-of-sale devices 211, 212, and 213 and determines possible points-of compromise at point-of-sale (POS) device 211 and POS device 213. The point-of compromise at POS device 211 can be a skimmer device 260 that reads the magnetic strip information of transaction cards presented at the POS device 211 and transmits the information to a bad actor. The point-of-compromise at POS device 213 can be malware software 270 installed on the POS device 213 that captures account information from a transaction card and transmits the information to a bad actor. Other types of devices and software besides skimmer devices and malware may be used at points-of-sale devices to compromise transaction information.

Figure 3:
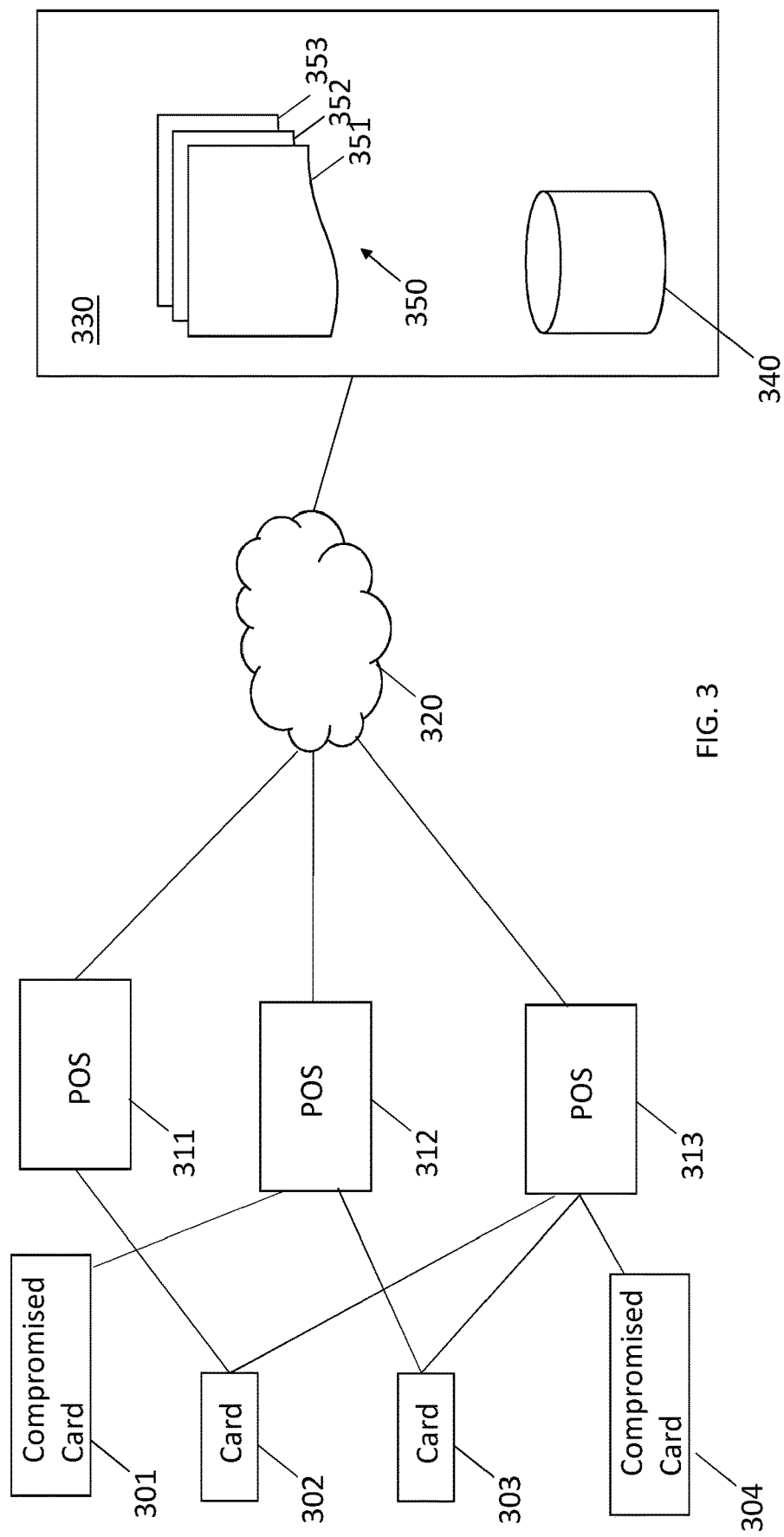
FIG. 3 is an example block diagram of a point-of-compromise detection system, in accordance with some embodiments of the present disclosure.

FIG. 3 illustrates a point-of-compromise detection system 300 that includes transaction cards 301, 302, 303, and 304; points-of-sale devices 311, 312, and 313; network 320, and a point-of-compromise detection server 330. The point-of-compromise detection server 330 includes a memory or database 340 to store information received regarding the point-of-sale devices. In an example embodiment, the database 340 stores matrices 350 including matrix 351, matrix 352, matrix 353, etc. that contain data regarding transaction cards 301, 302, 303, and 304 and points-of-sale devices 311, 312, and 313. The point-of-compromise detection server 330 processes data received from the points-of-sale devices 311, 312, and 313 and determines possible points-of compromise at point-of-sale (POS) device 311 and POS device 313. The information processed by the point-of-compromise detection server 330 determines that cards 301 and 304 are compromised and the point-of-compromise detection server 330 can send alerts to card issuers regarding the determination of compromise for each card. The issuer can terminate authorization and/or take additional steps to remedy the compromised cards.

Figure 4:
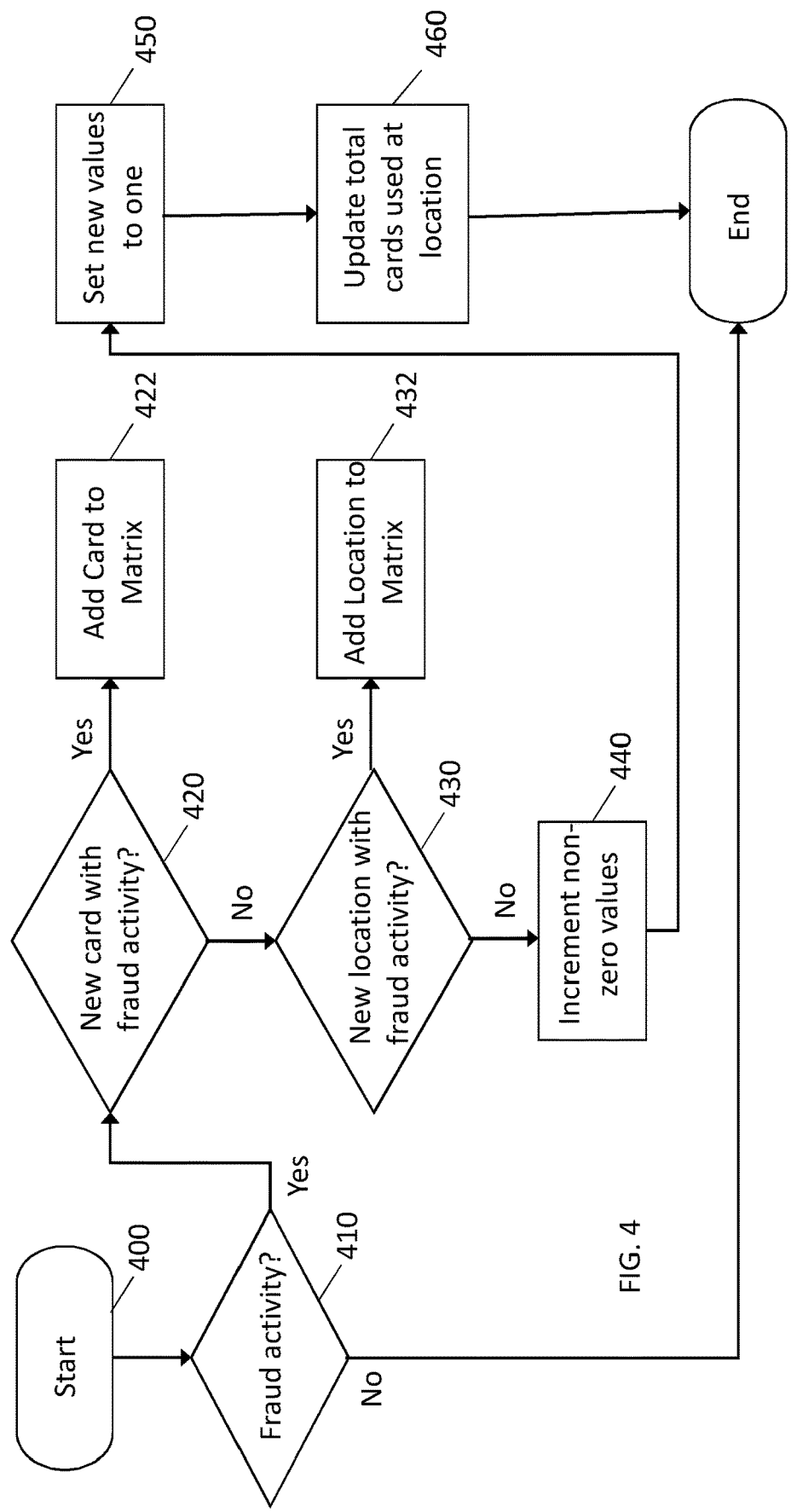
FIG. 4 is an example flow diagram outlining a process for point-of-compromise detection in accordance with some embodiments of the present disclosure.

FIG. 4 illustrates an exemplary flowchart outlining the generation of a new two dimensional matrix for locations and cards for a particular time interval in accordance with some embodiments of the present disclosure. Additional, fewer, or different operations may be performed in the method depending on the implementation and arrangement. The method 400 conducted by a data processing system (e.g. point-of-compromise detection server 130, shown and described with reference to FIG. 1) includes determining if there are new fraudulent activities during the time interval (410), identifying whether new cards have fraudulent or suspicious activity (420), adding new cards/rows to a card-location matrix (422), assessing if new locations have fraudulent or suspicious activity (430), adding new locations/columns to the card-location matrix (432), incrementing non-zero values for cards that had new fraudulent activity (440), setting all new location/card fraud pairs to 1 (450), and updating total cards transactions at location (460).

The point-of-compromise detection system generates a new two dimensional matrix for a time interval which is copy of a two dimensional matrix for the previous time interval. The copy serves as the basis for the two dimensional matrix generated for the time interval that just transpired and is updated with collected data for the time interval that just transpired.

At operation 410, the point-of-compromise detection system determines if there have been any new fraudulent or suspicious activity. If the point-of-compromise detection system determines that there were no new fraudulent transactions, then only the total card transactions need to be updated at locations which have had previous fraudulent or suspicious activity. If the point-of-compromise detection system determines that there has been new fraudulent or suspicious activity, then the system determines where these new fraudulent or suspicious activity occurred in order to generate the new two dimensional matrix for the time interval that just transpired.

At operation 420, the point-of-compromise detection system determines if there have been new cards involved with new fraudulent or suspicious activity. If the point-of-compromise detection system determines that new cards were involved with new fraudulent or suspicious behavior, the point-of-compromise system, at operation 422, adds these new cards as rows to the matrix. Otherwise, no new cards or rows will be added to the matrix.

At operation 430, the point-of-compromise detection system determines if there have been new locations involved with new fraudulent or suspicious activity. If the point-of-compromise detection system determines that new locations were involved with new fraudulent or suspicious behavior, the point-of-compromise detection system, at operation 432, adds these new locations as columns to the matrix. Otherwise, no new locations or columns will be added to the matrix.

At operation 440, the point-of-compromise detection system increments non-zero values for cards that had new fraudulent or suspicious activity during the time interval that just transpired. This increment affects all of the POC indicators and POC acceleration indicators relating to all locations for that particular card. This change represents that the card is still engaging in fraudulent and suspicious activity and may have been compromised at one of the previous locations.

At operation 450, the point-of-compromise detection system sets all new location/card pairs to 1. These values are used to determine the POC indicators and POC acceleration indicators relating to all new locations for that particular card.

At operation 460, the point-of-compromise detection system updates the total cards used at location to be the total of the previous time interval's matrix added to the total new cards that have engaged in transactions at each location.

The method depicted in FIG. 4 can also be used to update an existing two dimensional matrix for locations and cards for a particular time interval, in accordance with some embodiments of the present disclosure. The operations for updating an existing two dimensional matrix are similar to generating a new two-dimensional matrix as described previously. The only difference is that the updated matrix for the time interval that just transpired will replace the previous matrix. In such circumstances, the point-of-compromise detection server stores previous POC indicators and POC acceleration indicators for each location. Similarly, the point-of-compromise detection server may store previous card fraud indicators and card fraud acceleration indicators.

FIG. 5A depicts a matrix used by an example point-of-compromise detection system. FIGS. 5B-5F represent how different types of collected data can affect the matrix. The collected data may cause any combination of modifications exemplified in FIGS. 5B-5F or others. The matrix of FIG. 5A includes rows of transaction cards and columns of locations. In the matrix, the fraud cards are denoted as $C\_1$, $C\_2, C\_3, \ldots, C\_i$. For each card $C\_i$, the system collects all the locations with known or suspicious fraud transactions in a time window and locations in the same time window with non-fraud transactions and transaction times before the latest known or suspicious fraud transaction. The locations can be a physical location like a gas station or restaurant, or a branch of the chain stores in the same ZIP code or area, or a brand, or even a website. The system denotes a collection of all distinct locations from all the above fraud cards as $L\_1, L\_2, L\_3, \ldots, L\_j$. The transaction locations could be hierarchal. For example, a gas station and its branch or brand could be listed and treated equally as transaction locations in the algorithm. In an exemplary embodiment, the system starts with the assumed state that there are no known points-of-compromise or compromised cards have been reissued or replaced. Reissued or replaced cards are not included in the monitoring and analysis system, unless they have new fraud transactions.

The system constructs a matrix M with all $L\_j$ as the columns and all $C\_i$ as the rows. The matrix cell $m\_{ij}$ takes value of 1 if $C\_i$ had transactions in the past 6 months at $L\_j$, otherwise 0. Due to the size of all $L\_j$ together, the matrix M would be sparse with many of the cells having value of 0. There is additional row at the matrix bottom, which is the total number of distinct cards that had transactions at each $L\_j$ at the same time window.

After a time interval such as a day or a week, the system updates the matrix M. Updates to the matrix are adjustable, including a few hours, a few days, a few weeks, or even a few months. Once the time interval length is set, the system performs consecutive monitoring and analysis on the matrix M at each interval. The following description provides five sample update scenarios (shown in FIGS. 5B-5F). In practice, the update could be any mixtures of these five scenarios.

FIG. 5B depicts a modified matrix as compared to the matrix of FIG. 5A after a new time interval has passed, where no known or suspicious transactions occurred. In this case, the last row, which represents the total number of cards used at each location, is the only part of the matrix that is updated by the point-of-compromise detection system.

In the modified matrix of FIG. 5B, all the zeros and ones remain the same, and even the last row remains the same, meaning no known or suspicious fraud transactions occurred during the current interval and no new card had transactions at any of the locations. Or all the zeros and ones remain the same, but some cells of the last row get updates, meaning no known or suspicious fraud transactions occurred, but there were some new cards that had transactions at some of the locations. In the modified matrix of FIG. 5B, the $2^{nd}$ and $4^{th}$ cells of the last row are updated as some new cards had non-fraud transactions at these locations.

FIG. 5C shows a modified matrix as compared to the matrix of FIG. 5A after a new time interval has passed, where new fraudulent or suspicious transactions have occurred at locations already contained within the matrix and at specific locations where cards have had previous fraudulent transactions. This means that this specific location/card pair has had previous fraudulent or suspicious transactions. In this case, the point-of-compromise detection system increments, by one, the non-zeros representing previous fraudulent or suspicious transactions at any location for this card.

In the matrix of FIG. 5C, some cards had new fraud transactions at the locations where they had transactions before. At the row where the card is, the system updates all the one's to two's, while all zeros remain the same. Note a card might have multiple fraud transactions at different locations where the card had transactions before during the same interval and the system updates the one's to two's, not to three or more for the current interval. As such, the system provides weights to frequent fraud cards, and in the meantime, avoid giving over weights. Below is an illustration example where card $C\_5$ had new fraud transaction at location $L\_1$. Note that the value at the cell $L\_5$ is updated to 2 as well. The last row of the matrix M remains the same because the existing cards had transactions at the existing locations.

FIG. 5D illustrates a modified matrix as compared to the matrix of FIG. 5A after a new time interval has passed, where new fraudulent or suspicious transactions have occurred at locations already contained within the matrix and at specific locations where cards have not had previous fraudulent transactions. This means that these locations have had other fraudulent or suspicious transactions with other cards, but has not had fraudulent or suspicious transactions with this particular card. In this case, the point-of-compromise detection system updates the zeroes to ones where the new fraud transactions occurred. The point-of-compromise detection system also increments, by one, the non-zeros representing previous fraudulent or suspicious transactions at other locations.

In the matrix of FIG. 5D, some cards had new fraud transactions at the locations but they did not have transactions before and the locations already exist in the matrix M. The system updates the zero's to one's where the fraud transactions occurred, and updates the one's at the same row to two's. All the other zero's at the same row remain the same. Below is an illustration example where value of the cell $m\_{1,1}$ is changed from 0 to 1 as card $C\_1$ had new fraud transaction(s) at location $L\_1$. Note that all the ones at the same row are updated to two's.

FIG. 5E depicts a modified matrix as compared to the matrix of FIG. 5A after a new time interval has passed, where new fraudulent or suspicious transactions have occurred at locations not already contained within the matrix. This means that these locations have not had other fraudulent or suspicious transactions with other cards. In this case, the point-of-compromise detection system begins by adding new columns to the matrix representing these new locations. The point-of-compromise detection system also updates the zeroes to ones where the new fraud transactions occurred.

In the modified matrix of FIG. 5E, some cards had new fraud transactions at the locations which did not exist in the matrix M before. The system expands the matrix M by adding one more location column. All cards that had transactions at the new location from the beginning time window up to the time right before the new fraud transaction occurred, have value of 1, otherwise 0. Below is an illustration example where card $C\_2$ had new fraud transaction at location $L\_9$ in the current interval. Note that the cell $m\_{6,9}$ also has value of 1 as card $C\_6$ had transactions at $L\_9$ that occurred before the new fraud transaction. At the bottom, the new column $L\_9$ has its corresponding total number of transactions up to the time right before the new fraud transaction occurred.

FIG. 5F illustrates a modified matrix as compared to the matrix of FIG. 5A after a new time interval has passed, where new fraudulent or suspicious transactions have occurred using new cards that have not previously been involved with fraudulent or suspicious transactions. This means that these new cards are having fraudulent transactions at locations which have had previous fraudulent transactions with other cards. In this case, the point-of-compromise detection system adds new rows to the matrix representing these new cards and sets fraudulent location/card pairs to one.

In the modified matrix of FIG. 5F, there are new cards that had fraud transactions at some locations in the matrix M. The system expands the matrix M by adding one more row for each of the new cards. Below is an illustration example where a new card $C\_7$ had fraud transaction(s) at location $L\_3$. Note that the cells $m\_{7,4}$ and $m\_{7,8}$ have value of one as card $C\_7$ had transactions at these locations up to the time right before the new fraud transaction occurred and that the corresponding cells in the last row are updated as well.

The five scenarios described with reference to FIG. 5B-5F or a mixture of the scenarios are possible updates for the matrix M in interval 1. The matrix can be horizontally and/or vertically expandable. In the meantime, the matrix can be horizontally and/or vertically shrinkable as well.

At time interval 2, the system updates matrix M. If the same card had fraud transactions in interval 2, the system incrementally updates the values. So, if the value is 1, now it becomes 2, and if it's 2, now it becomes 3, and so on. At the end of each interval, the system continues doing similar incremental updates. In this way, the system continues cumulatively monitoring the card fraud occurrence and interactions with the locations.

At each interval, after updating the matrix M, the system computes various values with the matrix. First, the system sums all rows except the last one for each column, then takes the ratio of the sum over the total number of cards at the same location, whose value is stored in the last row of the same matrix M. This ratio is a POC (points-of-compromise) indicator. Second, the system sums all columns for each row (except the last row) to find a card fraud indicator value. The system performs the two calculations starting at the initial time window when all the cells of the matrix M only contain zeros or ones. For convenience, the initial time window is interval 0. Starting at interval 1, besides calculating POC indicator and card fraud indicator, the system does two more calculations, including the ratio of (interval 1 POC indicator−interval 0 POC indicator)/interval 0 POC indicator. This ratio is the POC acceleration indicator. The system also determines the ratio of (interval 1 card fraud indicator−interval 0 card fraud indicator)/interval 0 card fraud indicator to find a card fraud acceleration indicator. These computations continue for interval 2, interval 3, and so on.

At each interval, the system assesses the three measures: POC indicator, POC acceleration indicator, and card fraud acceleration indicator. The POC indicator works well when the total number of cards at the locations, which is stored in the last row of the matrix M, is relatively small. For instance, if a small coffee shop had 30 cards that had transactions in the past interval, and if, after one or more than one intervals, 10 of them had fraud in various locations, its POC indicator would be ⅓. The population of the cards used in the coffee shop was small, and the POC indicator was relatively high. Thus, this measure makes the coffee shop stand out as a potential POC, which needs follow-up investigations. The matrix M is configured such that whenever a card has a fraud transaction at a location, all other locations where the same card had transactions in the past, get updated. If a card is compromised at a location, it is likely to be used somewhere else. With the matrix M, the system keeps tracks of the past locations of a card which had a new fraud transaction. If the updates of multiple cards connect to a common location, its POC indicator and/or POC acceleration indicator would be high which makes it stand out as a potential POC. In at least one embodiment, the system receives data confirming or not confirming the potential POC as a compromised location.

Another feature of the matrix M is that the system keeps the cumulative information of all card transactions up to current time interval. Even if the system makes discrete interval observations, each time, the system observes all the information up to current. A compromise window usually is a short time of period like just a few days. In an example embodiment, the system has a cumulative card transaction history, so that we avoid breaking up a possible compromise window and not detecting a POC. We can adjust the observation intervals if needed to promptly catch any short compromise windows. If a card has new fraud transactions, the system incrementally updates the related cells in the matrix M. This way, the system gives proper weights to the frequent fraud cards in the three measures. If a card has frequent fraud transactions over observation intervals, the card fraud acceleration indicator would have high values over consecutive observation intervals, which can help determine if there is a need to reissue or replace this card.

The POC acceleration indicator works well when the total number of cards at the locations is relatively large. A Walmart location, for example, might have 1000 cards that were used in store recently. If 5 cards had subsequent fraud transactions in the first observation interval, 15 cards in the second observation interval, and 45 cards in the third observation interval, the three POC indicator values would not be high, but the two consecutive POC acceleration indicators would be high. The high POC acceleration indicators show a possible POC at this Walmart location. In at least one embodiment, the system uses the three measures together to make optimal business decisions.

After the system determines a location had cards that were compromised, the system sends instructions to reissue or replace these compromised cards even if they did not have any fraud transactions, which are usually the majority part of the total cards in the last row of the matrix M. For the fraud cards in the matrix M, if they have been reissued or replaced, they are removed from the matrix M. After fraud cards (rows) from the matrix are removed from the matrix, some columns (locations) might only have value of zeros as the matrix M is sparse and such columns can be removed as well. Therefore, the matrix M could be horizontally and/or vertically shrinkable. On the other hand, if any cards in the matrix whose latest fraud transactions occurred already 6 months ago (beyond the length of the initial time window), and these cards did not belong to any POC events yet, the system removes these old fraud cards, thereby shrinking the dimension of the matrix M. Such sizing of the matrix can be done at every observation interval to make the matrix M ready for expansion at the next observation interval.

Figure 6C:
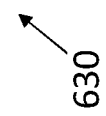

Referring now to FIGS. 6A-6C, there are three matrices 610, 620, and 630 which represent three adjacent time intervals. The matrices 610, 620, and 630 show the card fraud indicator, the card fraud acceleration indicator, the POC indicator, and the POC acceleration indicator. The card fraud indicator is generated by summing all values for a specific card (sum all the numbers in a row). For example, in matrix 610, the card fraud indicator for card 1 (C1) is 3, for C2 is 2, for C3 is 3, for C4 is 4, etc.

The card fraud acceleration indicator is generated by calculating the ratio of (interval 1 card fraud indicator−interval 0 card fraud indicator)/interval 0 card fraud indicator. For ease of reading, values that change between intervals are shown in boldface, italics, and underlining. The card fraud acceleration indicator in matrix 620 reflects changes to values from matrix 610 to matrix 620, or from interval 0 to interval 1. By way of example, C1 changes from matrix 1 to matrix 2 by increasing L3 from 0 to 1, increasing L4 from 1 to 2, and increasing L6 from 1 to 2. The card fraud indicator, thus, increases from 3 in matrix 610 to 6 in matrix 620. The card fraud accelerator indicator for C1 in matrix 620 is (6 (new fraud indicator)−3 (old fraud indicator))/3 (old fraud indicator) or 1.

Looking at matrix 630, because the indicators for C1, C2 and C3 do not change from matrix 620 to matrix 630, the card fraud acceleration indicator becomes zero (0) again.

The POC indicator is generated by summing all values for a specific location except the 'total cards used at location' row (sum all the numbers in a column except the 'total cards used at location' row). For example, in matrix 610, the POC indicator for location 1 (L1) is 2, for L2 is 2, for L3 is 3, for L4 is 3, etc. The POC acceleration indicator is generated by calculating the ratio of (interval 1 POC indicator−interval 0 POC indicator)/interval 0 POC indicator. So, for example, looking at matrix 610 (interval 0) and matrix 620 (interval 1), the POC indicator for location 3 has increased from 3 to 5 because the fraud numbers at location 3 have increased for C1, C3 and C6. The resulting POC acceleration indicator is, thus, (5(new POC indicator)−3 (old POC indicator))/3 (old POC indicator) or 0.667.

Matrix 610 is also provided below.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality,

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 0 | 1 | 0 | 1 | 1 | 0 | 3 | 0 |
| C2 | 1 | 0 | 1 | 0 | 0 | 0 | 0 | 0 | 2 | 0 |
| C3 | 0 | 1 | 0 | 1 | 1 | 0 | 0 | 0 | 3 | 0 |
| C4 | 0 | 0 | 0 | 0 | 0 | 1 | 1 | 1 | 3 | 0 |
| C5 | 1 | 0 | 0 | 0 | 1 | 0 | 0 | 0 | 2 | 0 |
| C6 | 0 | 1 | 1 | 0 | 0 | 1 | 1 | 1 | 5 | 0 |
| C7 | 0 | 0 | 1 | 1 | 0 | 0 | 0 | 1 | 3 | 0 |
| POC Indicator | 0.095 | 0.044 | 0.088 | 0.333 | 0.077 | 0.075 | 0.064 | 0.057 | n/a | n/a |
| POC Acceleration | 0 | 0 | 0 | 0 | 0 | 0 | 0 | 0 | n/a | n/a |
| Total Cards | 21 | 45 | 34 | 9 | 26 | 40 | 47 | 53 | n/a | n/a |

Matrix 620 is also provided below.

and any two components capable of being so associated can

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | *1* | *2* | 0 | *2* | 2 | 0 | 7 | *1.33* |
| C2 | 1 | 0 | 1 | 0 | 0 | 0 | 0 | 0 | 2 | 0 |
| C3 | 0 | *2* | *1* | *2* | 2 | 0 | *0* | 0 | 7 | *1.33* |
| C4 | 0 | 0 | 0 | 0 | 0 | 1 | 1 | 1 | 3 | 0 |
| C5 | 1 | 0 | 0 | 0 | 1 | 0 | 0 | 0 | 2 | 0 |
| C6 | 0 | *2* | *2* | 0 | 0 | *2* | *2* | *2* | *10* | *1* |
| C7 | 0 | 0 | 1 | 1 | 0 | 0 | 0 | 1 | 3 | 0 |
| POC Indicator | 0.095 | *0.089* | *0.176* | *0.556* | 0.115 | 0.125 | 0.106 | 0.075 | n/a | n/a |
| POC Acceleration | 0 | *1* | *1* | *0.670* | 0.494 | *0.667* | *0.334* | *0.5* | n/a | n/a |
| Total Cards | 21 | 45 | 34 | 9 | 26 | 40 | 47 | 53 | n/a | n/a |

Matrix 630 is also provided below.

also be viewed as being "operably couplable," to each other

|  | L1 | L2 | L3 | L4 | L5 | L6 | L7 | L8 | Card Fraud Indicator | Card Fraud Acceleration |
|---|---|---|---|---|---|---|---|---|---|---|
| C1 | 0 | 0 | 1 | 2 | 0 | 2 | 2 | 0 | 7 | *0* |
| C2 | 1 | 0 | 1 | 0 | 0 | 0 | 0 | 0 | 2 | 0 |
| C3 | 0 | 2 | 1 | 2 | 2 | 0 | 0 | 0 | 7 | *0* |
| C4 | 0 | 0 | 0 | 0 | 0 | *2* | *2* | *2* | *6* | *1* |
| C5 | 1 | 0 | 0 | 0 | 1 | 0 | 0 | 0 | 2 | 0 |
| C6 | 0 | 2 | 2 | 0 | 0 | 2 | 2 | 2 | 10 | *0* |
| C7 | 0 | 0 | 1 | 1 | 0 | 0 | 0 | 1 | 3 | 0 |
| POC Indicator | 0.095 | 0.089 | 0.176 | 0.556 | 0.115 | *0.150* | *0.128* | *0.094* | n/a | n/a |
| POC Acceleration | 0 | *0* | *0* | *0* | 0 | *0.2* | *0.208* | *0.253* | n/a | n/a |
| Total Cards | 21 | 45 | 34 | 9 | 26 | 40 | 47 | 53 | n/a | n/a | to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising a processor having programmed instructions stored in memory that when executed cause the apparatus to:
    receive, via a communication network, information regarding suspicious fraud activity involving a plurality of transaction cards, wherein the received information regarding suspicious fraud activity includes a non-fraudulent transaction performed by a first transaction card at a first location during a first time interval and a fraudulent transaction performed by the first transaction card at a second location during the first time interval, wherein the non-fraudulent transaction is before the fraudulent transaction;
    monitor changes over a second time interval to the received information regarding suspicious fraud activity at the first and second locations;
    identify a point-of-compromise (POC) location based on monitored changes surpassing a threshold indicating that the first transaction card was compromised at the first location over the first time interval;
    arrange the received information regarding suspicious fraud activity into a two-dimensional matrix, wherein each column of the two-dimensional matrix corresponds to a different location, each row of the two-dimensional matrix corresponds to a different transaction card, and each cell of the two-dimensional matrix comprises a counter of fraudulent activity of a transaction card at a location, the first transaction card corresponding to a first row of the two-dimensional matrix;
    increment a first counter in the first row that corresponds to the second location responsive to receiving the information regarding the fraudulent transaction performed by the first card at the second location;
    determine the first transaction card that corresponds to the first row of the two-dimensional matrix has not been associated with a fraudulent transaction for a third time interval subsequent to the first time interval having a duration exceeding a threshold; and
    responsive to the determination that the first transaction card has not been associated with a fraudulent transaction for the third time interval, remove the first row comprising the incremented first counter from the two-dimensional matrix.

2. The apparatus of claim 1, wherein the two-dimensional matrix is a first two-dimensional matrix, and wherein the processor is further configured to arrange the received information regarding suspicious fraud activity over a fourth time interval into a second two-dimensional matrix using received suspicious fraud transaction information, locations, and the plurality of transaction cards.

3. The apparatus of claim 2, wherein the processor is further configured to identify the POC location by comparing data between the first two-dimensional matrix and the second two-dimensional matrix and identifying the POC location responsive to identifying a change in data between the first two-dimensional matrix and the second two-dimensional matrix based on the comparison.

4. The apparatus of claim 3, wherein the processor is configured to compare the data by determining a POC indicator, a POC acceleration indicator, and a card fraud acceleration indicator.

5. The apparatus of claim 1, wherein the processor is further configured to arrange the received information regarding suspicious fraud activity at a plurality of locations over a plurality of time intervals into a three-dimensional matrix of suspicious fraud transaction information, the plurality of locations, and the plurality of transaction cards.

6. The apparatus of claim 5, wherein the apparatus identifies the POC location by calculating a POC acceleration indicator.

7. A computerized method comprising:
collecting, by a computer processor, location data for suspicious fraud transactions involving a plurality of transaction cards over a first time interval, wherein the location data for suspicious fraud transactions includes a non-fraudulent transaction performed by a first transaction card at a first location during the first time interval and a fraudulent transaction performed by the first transaction card at a second location during the first time interval, wherein the non-fraudulent transaction is before the fraudulent transaction;
arranging, by the computer processor, the collected location data into a two-dimensional matrix, wherein each column of the two-dimensional matrix corresponds to a different location, each row of the two-dimensional matrix corresponds to a different transaction card, and each cell of the two-dimensional matrix comprises a counter of fraudulent activity of a transaction card at a location, the first transaction card corresponding to a first row of the two-dimensional matrix;
incrementing, by the computer processor, a first counter in the first row that corresponds to the second location responsive to receiving the information regarding the fraudulent transaction performed by the first card at the second location;
determining, by the computer processor, the first transaction card that corresponds to the first row of the two-dimensional matrix has not been associated with a fraudulent transaction for a second time interval subsequent to the first time interval having a duration exceeding a threshold; and
responsive to the determination that the first transaction card has not been associated with a fraudulent transaction for the second time interval, removing, by the computer processor, the first row comprising the incremented first counter from the two-dimensional matrix.

8. The method of claim 7, further comprising collecting location data for non-fraudulent transactions over the first time interval.

9. The method of claim 7, further comprising generating from indicators in the two-dimensional matrix at each update the candidate POC location by generating from the two-dimensional matrix at each update a POC indicator, a POC acceleration indicator, and a card fraud acceleration indicator.

10. The method of claim 9, further comprising generating an alert regarding the POC location based on the POC indicator, the POC acceleration indicator, and the card fraud acceleration indicator.

11. The method of claim 7, further comprising repeating the collecting operations over additional time intervals.

12. The method of claim 7, wherein indicators in the two-dimensional matrix including a rate of change of the suspicious fraud transactions at the first location.

13. A non-transitory computer readable media with computer-executable instructions embodied thereon that, when executed by a processor of a system, cause the system to perform a process comprising:
collecting location data for suspicious fraud transactions over a first time interval, wherein the location data for suspicious fraud transactions includes a non-fraudulent transaction performed by a first transaction card at a first location during a first time interval and a fraudulent transaction performed by the first transaction card at a second location during the first time interval, wherein the non-fraudulent transaction is before the fraudulent transaction;
arranging, by the computer processor, the collected location data into a two-dimensional matrix, wherein each column of the two-dimensional matrix corresponds to a different location, each row of the two-dimensional matrix corresponds to a different transaction card, and each cell of the two-dimensional matrix comprises a counter of fraudulent activity of a transaction card at a location, the first transaction card corresponding to a first row of the two-dimensional matrix;
incrementing, by the computer processor, a first counter in the first row that corresponds to the second location responsive to receiving the information regarding the fraudulent transaction performed by the first card at the second location;
determining, by the computer processor, the first transaction card that corresponds to the first row of the two-dimensional matrix has not been associated with a fraudulent transaction for a second time interval subsequent to the first time interval having a duration exceeding a threshold; and
responsive to the determination that the first transaction card has not been associated with a fraudulent transaction for the second time interval, removing, by the computer processor, the first row from the two-dimensional matrix.

14. The non-transitory computer readable media of claim 13, wherein the two-dimensional matrix includes indicators including a rate of change of the suspicious fraud transactions at the first location.

15. The non-transitory computer readable media of claim 13, wherein the first time interval is adjustable.

16. The non-transitory computer readable media of claim 13, further comprising resizing the two-dimensional matrix based on collected data.

17. The non-transitory computer readable media of claim 13, further comprising receiving data confirming the candidate POC location as compromised.

18. The apparatus of claim 1, wherein the processor is further configured to:
responsive to identifying the POC location, transmit instructions to replace a second transaction card that performed a transaction at the POC during the first time interval; and
responsive to transmitting the instructions to replace the second transaction card, remove the second row from the two-dimensional matrix.

* * * * *